(No Model.)
A. HARRY.
COFFEE POT.
No. 386,817. Patented July 31, 1888.
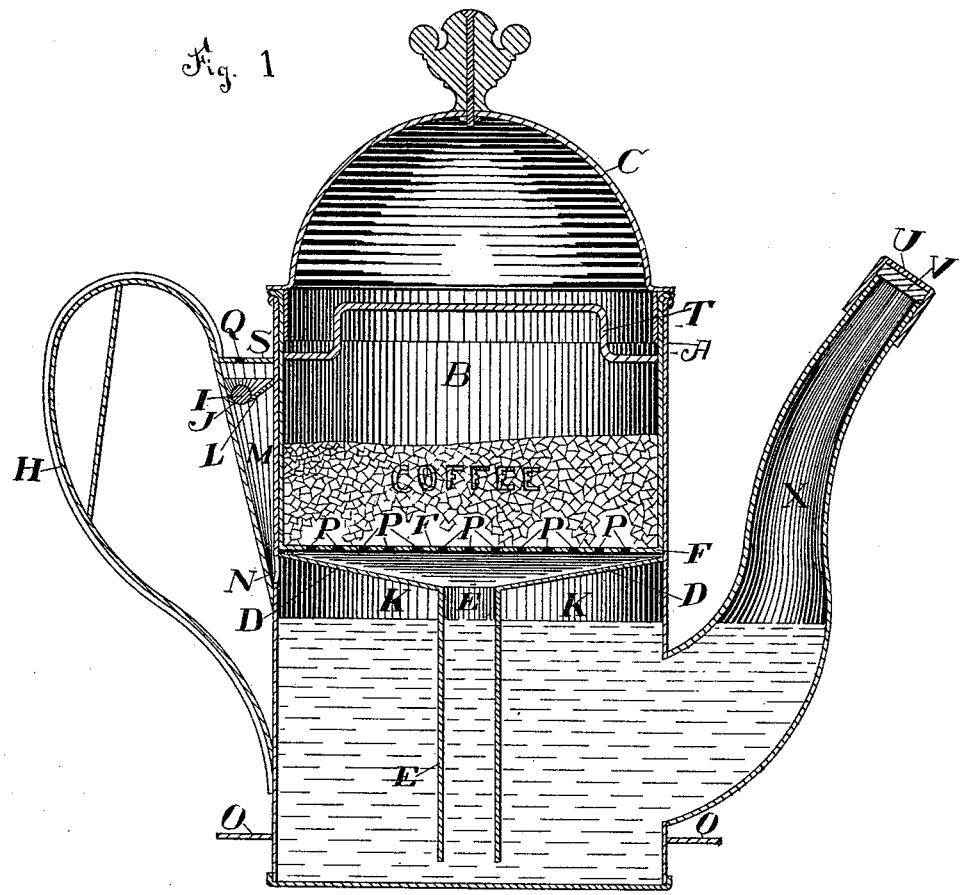
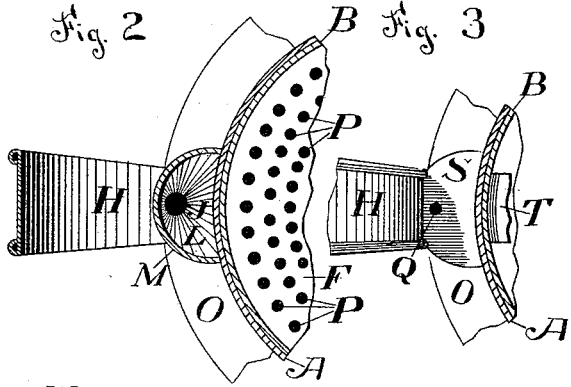
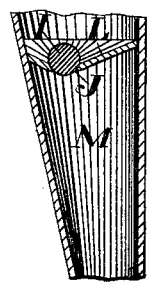
Witnesses
A. C. Carner
Ed J Smith
Inventor
August Harry
by Hazard & Townsend
his attys

UNITED STATES PATENT OFFICE.

AUGUST HARRY, OF LOS ANGELES, CALIFORNIA.

COFFEE-POT.

SPECIFICATION forming part of Letters Patent No. 386,817, dated July 31, 1888.

Application filed November 5, 1886. Serial No. 218,114. (No model.)

*To all whom it may concern:*

Be it known that I, AUGUST HARRY, a citizen of the United States, residing at Los Angeles, in the county of Los Angeles and State of California, have invented a new and useful Improvement in Coffee-Pots, of which the following is a specification.

In order to make a beverage in which the full aroma and flavor of the coffee are preserved it is necessary that the steam should not escape from the pot while the beverage is being made, and the coffee-grounds must not be allowed to remain in the water after the beverage has been made.

The object of my invention is to construct a coffee-pot in which the aroma of the coffee will be confined and in which the coffee remains in the water only while it is boiling. I accomplish this object by means of the device described herein and illustrated in the accompanying drawings, in which—

Figure 1 is a vertical mid-section of my improved coffee-pot with coffee and water therein ready for use in making the beverage. Fig. 2 is a plan view illustrating the seat for the ball-valve. Fig. 3 is a plan view illustrating the top of the vent-chamber. Fig. 4 is an enlarged view of that portion of Fig. 1 which illustrates the escape-valve.

Within the can A of the coffee-pot, at such a distance above the bottom thereof as to allow the desired amount of water to be contained in the pot beneath it, is mounted a funnel-shaped partition, D, from the center of which a tube, E, extends downward. A movable receptacle, B, with a perforated bottom, F, is fitted tightly within the upper compartment of the pot above the partition D, extending to the top of the pot. The cover C fits therein, and a handle, T, is secured to the receptacle B, whereby the receptacle can be lifted out of the pot when desired. The cover fits the receptacle B closely, and the receptacle fits the can A closely, also, and a hermetical cap, V, is closely fitted on the end of the spout X.

In the side of the pot opposite the spout X an escape-passage, M, is provided, having an opening, N, into the pot immediately beneath the partition D. The vent at the top of the escape passage or chamber M is provided with a suitable valve, which will retain the steam in the lower compartment, K, of the pot below the partition until the pressure is sufficient to raise the valve.

The principle upon which my improved coffee-pot acts is as follows: The space beneath the partition D is filled with water above the lower end of the tube E. When the water is heated, the expansion of the water, air, and steam within the space beneath the partition forces the water up through the tube into and through the coffee in the receptacle B or upper compartment of the can and becomes impregnated with the flavor and aroma of the coffee. The portion of steam which arises from the water and coffee in B is retained by the cover of the pot, is condensed, and runs back into the boiling mass. When the coffee has boiled sufficiently long and the pot is removed from the fire, the water flows back into the space below the partition, and all the drip from the coffee is collected by the funnel-shaped partition and allowed to flow into the lower compartment.

It will be seen that the most essential features of my invention are the solid partition D and the tube E, mounted within the closed can, whereby the expansion of the water, air, and steam within the lower compartment forces the water up to the coffee in the upper compartment when the water is heated.

Other features shown, though not so essential, are of value in carrying out my invention.

The vent opening, from the space below the partition, is provided with a ball-valve constructed as shown.

L is the seat of the valve, which is a shallow funnel with its escape near the outer side, so that the inclination of the inner side of the funnel is slight enough to permit the ball-valve I to roll from the opening J when the pot is tipped.

The size of the hole J should be twice that of the hole N, which connects the passage or chamber M with the space or compartment below the partition D, and the ball should be of such size and weight as to retain the steam until the water is forced up through the coffee; but it should be light enough to allow the steam to escape as soon as the proper amount of water necessary to completely cover the coffee is forced up into the upper compartment.

It will be observed that while the pot stands perpendicular, as shown, the ball will rest upon the hole J and close the vent; but that when the pot is tipped forward to pour out the coffee the ball will roll from off the hole and allow the air to enter and supply the vacuum in the lower compartment, thus allowing the coffee to be poured out.

The cover C of the pot is made hemispherical, in order to give a more perfect surface for condensing the steam and collecting the water therefrom and passing it down into the coffee again. A cork, V, is inserted in the end of the cap U to form a more perfect joint and prevent the steam from passing out through the spout.

O is a flange extending round the bottom of the pot to sustain it when the pot is placed in the hole in the top of the stove. I do not claim this feature as new.

H is the handle of the pot; P, the perforations in the bottom of the receptacle.

S is the top of the vent chamber or passage, and Q is the vent therein.

It is not necessary that the tube E should extend so near to the bottom of the can as shown in the drawings; but it must be submerged in the water when the beverage is being made, or the water will not be forced up through it into the coffee when the water is heated, and it is therefore desirable that the end of the tube should be close to the bottom of the pot.

Valves different in construction from that shown may be used to retain the steam and give it vent; but I find the ball-valve shown to be most valuable, as the pressure required to move the ball and allow the steam to escape is invariable, while with spring-valves it is not, and the ball-valve automatically opens when the pot is tipped forward to pour the coffee.

The vent from the lower compartment might be dispensed with; but the convenience and efficiency of the pot would be greatly reduced.

It is obvious that the spout is not essential to the operation of my invention, as it has no function other than that of the spout of an ordinary coffee-pot. It is also obvious that if the spout enters the pot close enough to the bottom thereof a degree of efficiency would be attained, though the end of the spout should not be closed, as shown, as the water in the spout would prevent the escape of the steam sufficiently to create pressure enough to force the water up and submerge the coffee.

Instead of using the receptacle B, the coffee may be tied up loosely in a bag and placed upon the partition D; but I prefer to use the receptacle, as it is more convenient and allows the water to act more freely upon the coffee.

I am aware that heretofore coffee-pots have been constructed with a tube extending from a lower compartment upward through a separating diaphragm or partition to a point in the upper compartment above the diaphragm, whereby the water after being forced upward through the tube is retained in the upper compartment and not allowed to flow back into the lower compartment.

I am also aware that a coffee-pot has heretofore been constructed with a tube attached to and extending downward from the lower side of a perforated diaphragm, and I lay no claim to such construction as a part of my invention.

What I claim as new, and desire to secure by Letters Patent, is—

1. In a coffee-pot, the combination, as set forth, of the following elements: the can of the pot, a cross-partition dividing it into upper and lower compartments, and a tube opening into the upper compartment flush with the upper side of the partition and extending through the partition and opening into the lower compartment, whereby water forced from the lower compartment into the upper compartment by the pressure of steam when the water is sufficiently heated will afterward be allowed to flow back into the lower compartment.

2. A coffee-pot consisting of the following elements in combination, substantially as set forth: the can of the pot, a cross-partition dividing it into upper and lower compartments therein, a tube extending through such partition into the lower compartment, and the valve-closed vent opening into the lower compartment near the top thereof.

3. In a coffee-pot, the combination, substantially as set forth, of the following elements: the can A, partition D, dividing the can into upper and lower compartments, perforated bottom F, tube E, and chamber or passage M, opening into the lower compartment.

4. The combination of cover C, can A, partition D, tube E, perforated bottom F in upper compartment, B, inlet-passage M, valve I, seat J, spout X, and cap V.

5. In a coffee-pot, the combination, as set forth, of the following elements: the can A, spout X, passage M, valve seat L, shaped as a shallow funnel, and ball I, arranged substantially as set forth, whereby when the pot is perpendicular the valve will be closed by the ball, and when the pot is tipped forward to pour the coffee the valve will be opened, substantially as and for the purpose set forth.

AUG. HARRY.

Witnesses:
 JAS. R. TOWNSEND,
 M. G. HAMMOND.